United States Patent [19]

Mendes

[11] Patent Number: 5,764,844
[45] Date of Patent: Jun. 9, 1998

[54] SPLICE ORGANIZING APPARATUS

[75] Inventor: Luiz Neves Mendes, Begijnendijk, Belgium

[73] Assignee: N.V. Raychem S.A., Kessel-Lo, Belgium

[21] Appl. No.: 716,368

[22] PCT Filed: Mar. 6, 1995

[86] PCT No.: PCT/GB95/00472

§ 371 Date: Sep. 19, 1996

§ 102(e) Date: Sep. 19, 1996

[87] PCT Pub. No.: WO95/25978

PCT Pub. Date: Sep. 28, 1995

[30] Foreign Application Priority Data

Mar. 21, 1994 [GB] United Kingdom ............... 9405535

[51] Int. Cl.[6] .................................................. G02B 6/36
[52] U.S. Cl. .............................................................. 385/135
[58] Field of Search .................................. 385/134, 135

[56] References Cited

U.S. PATENT DOCUMENTS

| | | | |
|---|---|---|---|
| 4,359,262 | 11/1982 | Dolan | 385/135 |
| 4,679,896 | 7/1987 | Krafcik et al. | 385/135 |
| 4,911,521 | 3/1990 | Ryuto et al. | 385/135 |
| 5,042,901 | 8/1991 | Merriken et al. | 385/135 |
| 5,142,606 | 8/1992 | Carney et al. | 385/134 |
| 5,185,845 | 2/1993 | Jones | 385/135 |
| 5,231,687 | 7/1993 | Handley | 385/135 |
| 5,278,933 | 1/1994 | Hunsinger et al. | 385/135 |
| 5,323,480 | 6/1994 | Mullaney et al. | 385/135 |
| 5,337,400 | 8/1994 | Morin et al. | 385/135 |
| 5,353,367 | 10/1994 | Czosnowski et al. | 385/135 |

FOREIGN PATENT DOCUMENTS

| | | | |
|---|---|---|---|
| A0 490 644 | 6/1992 | European Pat. Off. | |
| 2579330 | 9/1986 | France | 385/135 |
| 58-97013 | 6/1983 | Japan | 385/135 |
| WOA94 12904 | 6/1994 | WIPO | |
| WOA94 24599 | 10/1994 | WIPO | |

*Primary Examiner*—John Ngo
*Attorney, Agent, or Firm*—Herbert G. Burkard

[57] ABSTRACT

Apparatus for arranging a plurality of stacks of optical fibre splice oganizers in a closure comprises a frame and at least two optical fibre splice organizer supports located on the frame, each organizer support being arranged to support a stack of organizers. The frame may be elongate and the organizer supports may each support a stack of organizers which extends laterally with respect to the frame. The organizer supports may be in one or more pairs, the supports of each pair being arranged back-to-back.

23 Claims, 14 Drawing Sheets

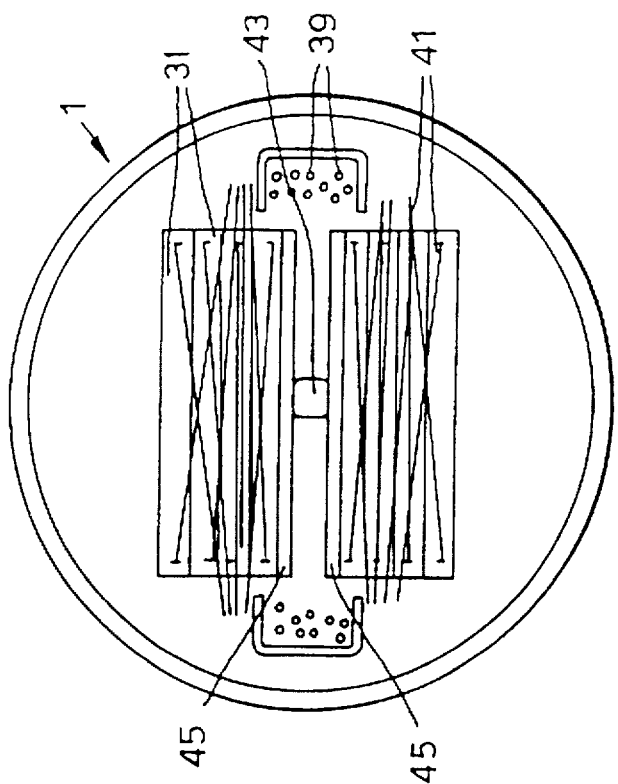
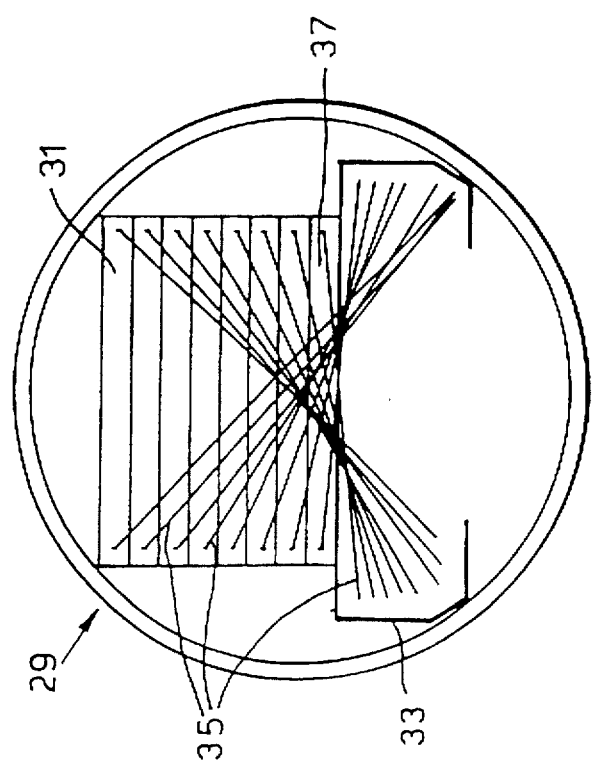
Fig.2.

Fig.6.
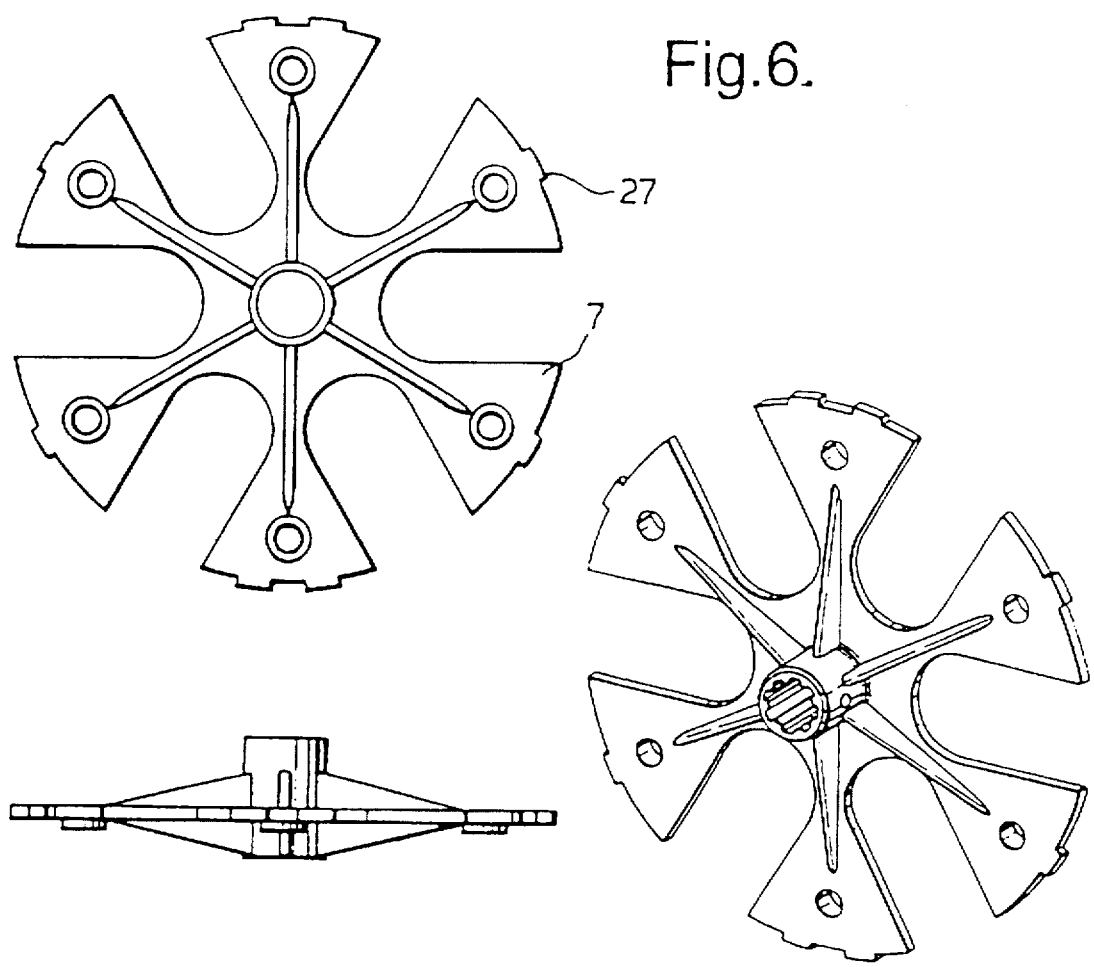
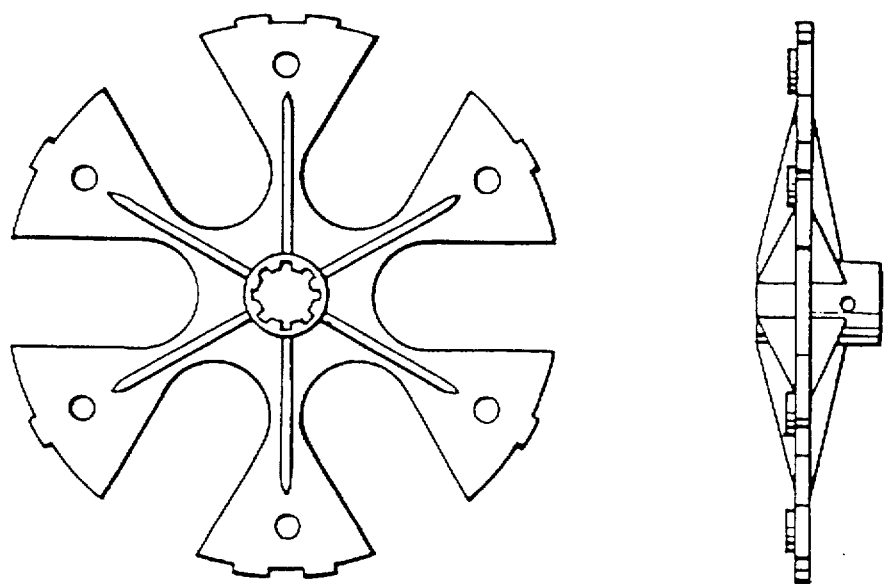

SPLICE ORGANIZING APPARATUS

BACKGROUND OF THE INVENTION

The present invention relates to apparatus for arranging a plurality of stacks of optical fibre splice organizers in a closure, a splice closure, a kit of parts and a support for a stack of optical fibre splice organizers.

Enclosing and organizing optical fibre splices has been carried out in a variety of different ways in an attempt to optimize accessibility of the splices, to simplify their reorganization and to improve the sealing of the splices from the environment. A widely used system of organizing optical fibre splices involves the use of several splice organizers, for example in the form of trays, cassettes or the like, each of which accommodates a number of splices, generally holding the splices in position, and normally also providing bend radius control for the optical fibres.

U.S. Pat. No. 4,359,262 discloses an enclosure for optical fibre cable splices, comprising two spaced apart end plates, a pair of spaced tie members connecting the end plates, and a plurality of elongate trays supported on the tie members and mounted one above another, each tray accommodating several splices. The trays are held on the tie members by means of one or more restraining members passing around the tie members and the trays.

U.S. Pat. No. 4,679,896 discloses a tray assembly for organizing optical fibre splices, comprising an open channel shaped main frame having a bottom wall and upwardly extending side walls. A number of splice trays are removably carried in the main frame in vertically spaced, juxtaposed relationship on threaded studs extending vertically upwardly from the bottom wall through openings in the trays. The trays are maintained in a predetermined vertically spaced relationship by bosses formed on the base of the main frame and about the openings in the trays.

A connecting box for optical fibre cables is disclosed in U.S Pat. No. 4,911,521. The connecting box includes a plurality of container trays, each adapted to contain surplus lengths of end portions of optical fibres, the tracks being stacked one upon another. The stack of trays is secured to an elongate connecting plate, by the lowermost tray being fastened thereto by means of suitable fastening means such as screws. Each tray is hingedly connected to each adjacent tray at one lateral side thereof in a releasable manner.

U.S. Pat. No. 5,042,901 discloses a watertight fibre optic splice closure having a passage in an end wall which is closed by a plug. A preconnected optical connector sleeve is mounted to be accessible from the passage, so that an outside optical fibre may be connected to a drop fibre without dismantling the closure. The splice closure comprises an exterior cylindrical shell and disc-shaped end walls. Rectangular metal supporting bars provide internal support and grounding, and a splice tray is mounted on one of the supporting bars.

SUMMARY OF THE INVENTION

According to a first aspect of the present invention, there is provided an apparatus for arranging a plurality of stacks of optical fibre splice organizers in a closure, comprising:

(a) a frame; and (b) at least two optical fibre splice organizer supports located on the frame;

wherein each organizer support is arranged to support a stack of organizers.

According to a second aspect of the invention, there is provided an optical fibre splice closure, comprising:

(a) apparatus according to the first aspect of the invention; and (b) a housing to enclose the apparatus.

According to a third aspect of the invention, there is provided a kit of parts for arranging a plurality of stacks of optical fibre splice organizers in a closure, comprising:

(a) a frame, at least part of which is elongate; and (b) at least two optical fibre splice organizer supports;

wherein each organizer support can be attached to the frame and can support a stack of organizers so that the stack extends laterally, preferably substantially perpendicularly, with respect to the frame or at least that part of the frame which is elongate.

According to a fourth aspect of the invention, there is provided a kit of parts for arranging one or more stacks of optical fibre splice organizers in a closure, comprising:

(a) a frame, at least part of which is elongate, the frame comprising means for locating at least two optical fibre splice organizer supports thereon; and (b) at least one optical fibre splice organizer support; wherein the or each organizer support can be attached to the frame and can support a stack of organizers so that the stack extends laterally, preferably substantially perpendicularly, with respect to the frame or at least that part of the frame which is elongate.

Any or all of the preferred features described below may comprise preferred features of the first, second, third or fourth aspects of the invention.

The term 'frame' as used herein is intended generally to have its normal or plain meaning, and generally excludes merely a housing of a closure, as such. The term 'organizer' as used herein generally includes trays, cassettes or the like and any other article for holding, organizing or accommodating optical fibre splices and/or splitters and the like. A 'stack' of such organizers may, in some embodiments of the invention, comprise only one organizer, but it is preferred that a stack comprises a plurality of organizers, normally arranged one on top of another.

The apparatus according to the first aspect of the invention, the optical fibre splice closure according to the second aspect of the invention and the kit of parts according to the third aspect of the invention have an advantage in that, because at least two organizer supports are provided, and therefore at least two stacks of optical fibre splice organizers (referred to herein as 'organizers') may be arranged in the closure, the accessibility of each organizer may be improved in comparision to closures in which the organizers are arranged in only one stack. This is because, when organizers are arranged in a stack, it is normally necessary to lift off the uppermost organizers in order to gain access to the lowermost organizers, for example, and for a given number of organizers in a closure, the number of organizers which need to be lifted off a lower organizer (or at least disturbed in some way) in order to gain access to the lower organizer may be at least halved when the organizers are arranged in only one stack. The invention may not only reduce the degree of skill and training required by field operatives who need to access the organizers (often referred to as 'craft sensitivity') and the length of time needed in order to gain such access, but it may also reduce the likelihood of damage or displacement of the optical fibres and splices.

An advantage of the kit of parts according to the fourth aspect of the invention is that the kit may be used to arrange just one stack of organizers in a splice closure but with the possibility of adding extra organizer supports to the frame, and hence extra stacks of organizers later. This aspect, and indeed all aspects, of the invention, has the benefit of modularity, i.e. that stacks of organizers may normally be added to, and removed from, the frame as and when required, according to the number of optical fibre splices which need to be accommodated.

In the kits of parts according to the third and fourth aspect of the invention, and according to a preferred embodiment of the apparatus according to the first aspect of the invention, at least part of the frame is elongate and each organizer support is arranged to, or can, support a stack of organizers so that the stack extends laterally, preferably substantially perpendicularly, with respect to the frame or at least with respect that part of the frame which is elongate. In a preferred embodiment of the second aspect of the invention, both the frame and the housing are elongate, the frame being arranged to extend longitudinally within the housing. These aspects of the invention have an advantage in that optical fibres extending into the closure may normally be routed in a straight forward manner to their respective organizers, especially when, for example, the frame extends in substantially the same direction as that in which the cables extend as they enter the splice closure. In addition, when the frame is elongate additional organizer supports may often be added to the frame along its length, thereby providing modularity.

Preferably, at least one of the organizer supports is, or can be, oriented differently with respect to the frame than at least one of the other organizer supports, and is, or can be, thereby arranged to support a stack of organizers which extends in a different direction to that supported by the or each other organizer support. This has an advantage in that it may provide optimum, or at least effective, utilisation of the space within the closure while at the same time dividing the organizers into a plurality of stacks (rather than having them arranged in a single stack) and therefore also obtaining the first mentioned advantage above, namely improved accessibility to each organizer. More preferably, the, or at least two of the, organizer supports are, or can be, located at substantially the same longitudinal position on the frame. This also has the advantage of effective utilisation of space.

In a particularly preferred embodiment, a pair of organizer supports are located, or locatable, at substantially the same longitudinal position on the frame, each being arranged to support a stack of organizers which extends in the opposite direction to that supported by the other organizer support. This preferred stacking arrangement may be thought of as producing a single stack which is divided into two separate stacks, one on each side of the frame, and it therefore provides the advantages mentioned above associated with reducing the number of organizers in any given stack. Preferably, the organizer supports of the pair are arranged back to back, for example so that the supports are in contact with each other or so that they are separated only slightly, with the frame extending between them.

Advantageously, organizer supports of the invention which are arranged, or which can be arranged, back to back may co-operate to provide one or more channels to guide one or more optical fibres, preferably in one or more tubes, extending, in use, into the closure. Preferably, the, or at least one of the channels is formed, at least in part, by one or more projections provided by one organizer support are longitudinally spaced from the projection(s) provided by the other organizer support along the channel. The provision of one or more such channels by the cooperation of organizer supports may, for example, eliminate the need to provide guiding means on the frame and/or on the housing of the closure. This may simplify, and hence reduce the cost of, the manufacturing process, particularly when, for example, the organizer supports are formed from moulded plastics material. Preferably, the, or at least one of the, channels is arranged to guide optical fibres which are not spliced within the closure.

Addition ally or alternatively, at least one of the organizer supports is provided with one or more retaining members arranged to retain one or more optical fibres, preferably in one or more tubes, which, in use, are spliced in at least one optical fibre splice organizer supported by the said organizer support. Preferably, the or each retaining member is arranged substantially to surround the optical fibres (or the tube(s) holding the optical fibres) and has a slit to allow the optical fibres to be positioned therein, and more preferably, the slit is inclined to the direction in which the fibres extend, in use, when they are in a relaxed state.

Preferred embodiments of the organizer supports of the first, second, third and fourth aspects of the invention are novel per se, and accordingly, a fifth aspect of the invention provides a support for one or more optical fibre splice organizers, which comprises:

(a) a first guide means to guide optical fibres which are spliced within the, or one of the, splice organizers which, in use, are supported by the support; and (b) a second guide means to guide optical fibres which are not spliced within any of the splice organizers which, in use, are supported by the support.

The fifth aspect of the invention has the advantage that the optical fibres entering a closure may be divided into those fibres which are spliced in the closure and those fibres which are not spliced in the closure. These two groups of fibres, which are normally carried in tubes, may, by means of the first and second guide means, be kept separate in a simple and effective way, generally leading to improved access to both groups of fibres and reduced craft sensitivity of the closure.

The first guide means may, for example, comprise the one o t more retaining members of the preferred organizer supports of the first, second, third and fourth aspects of the invention, and the second guide means may additionally or alternatively comprise the one or more channels provided by the cooperation, where present, of the back to back organizer supports of the first, second, third and fourth aspects of the invention.

A sixth aspect of the invention provides a support for one or more optical fibre splice organizers, which is provided with one or more retaining members to retain one or more optical fibres, the or each retaining member being arranged substantially to surround the optical fibres and having a slit to allow the optical fibres to be positioned therein, wherein the slit is inclined to the direction in which the fibres extend, in use, when they are in a relaxed state.

It was stated above that according to the first, second and third aspects of the invention, at least two organizer supports are, or can be located on the frame. Preferably, at least two of the organizer supports are, or can be, located at substantially the same longitudinal position of the frame, and more preferably these comprise a pair that are arranged back to back. According to a particularly preferred embodiment, one or more additional organizer supports are, or can be located at another longitudinal position on the frame. More preferably, two or more pairs of organizer supports are, or can be located on the frame, each pair being located at a different longitudinal position on the frame. The invention may therefore, as already mentioned, provide a modular system for arranging optical fibre splice organizers in a closure. For example, the apparatus of the first aspect of the invention may be supplied in the form of a frame having one or a plurality of pairs of organizer supports located thereon, longitudinally spaced along the frame. The customer may therefore purchase apparatus supplied with the requisite number of organizer supports to meet his present needs, or he may purchase apparatus having a greater number of organizer supports than needed at the time of purchase but which may be needed and used at a later date, for example as additional cables are spliced in the closure. Alternatively, the customer may purchase a kit of parts according to the third or fourth aspects of the invention and may himself assemble the apparatus from the kit, using as many or as few organizer supports as are required. Furthermore, the customer may purchase organizer supports separately from the frame of the apparatus or the kit, and may add such supports to the frame as and when they are needed.

Preferably, each organizer support is separable, in use, from the frame. More preferably, the organizer supports are a snap-fit or a push-fit on the frame, and it is preferred that they may be removed from the frame simply by pulling them off the frame or by pulling pairs of the orangizers apart. Another preferred method of attachment of the organizer supports to the frame is to slide them onto and along the frame. More preferably, the organizer supports may be slidable along the frame from one position to another. In one preferred embodiment, the organizer supports are provided integrally in pairs, or pre-assembled to form pairs, each pair having a central channel through which the frame may extend, each pair being slid onto the frame to complete the apparatus.

According to the fourth aspect of the invention, the frame comprises means for locating at least two optical fibre splice organizer supports thereon. The means, which may also advantageously be provided according to the first, second and third aspects of the invention, preferably comprise one or more indentations in, or protrusions on, the frame which may be located with, respectively, one or more protrusions on, or indentations in, each organizer support. Preferably, the means substantially prevent accidental sliding of the organizer supports along the frame.

Preferably, the frame comprises a single elongate member, for example in the form of a rod or a bar. Advantageously, the frame may be so shaped as to prevent rotational movement of the organizer supports with respect to the frame. This may, for example, be achieved by the frame having a non-circular cross-section, e.g. a polygonal, especially square, cross-section.

According to a further preferred embodiment of the first, second, third and fourth aspects of the invention, the frame is attached to, or is integral with, an attachment member which can attach the frame to the housing of the optical fibre splice closure. Preferably, the attachment member is located substantially at one end of the frame. For example, when the closure comprises an in-line splice closure, an attachment member may be provided at each end of the frame. It is generally preferred, however, for the closure to comprise a butt splice closure, in which case there is preferably only one attachment member, located at one end of the frame. The attachment member may, in use, advantageously transmit a axial forces acting on the cable to the housing. Preferably, therefore, the attachment member has one or more first parts for attachment to a cable and a second part for attachment to the housing. The second part of the attachment member is preferably arranged to cooperate with the housing substantially to prevent rotational movement of the attachment member with respect to the housing due to torsional forces on the cables. For example, the attachment member may be provided with one or more protrusions or indentations in the housing to prevent such rotational movement. Preferably, the frame is elongate and the attachment member extends perpendicularly, preferably radially, from the frame.

As indicated above, the splice closure according to the second aspect of the invention preferably comprises a butt splice closure, and more preferably the housing comprises a base, through which one or more cables may extend, and a cover for the base. Preferably, when the splice closure includes an attachment member as described above, the attachment member is arranged to be attached to the housing by being trapped between the base and the cover of the housing.

The attachment member, in use, preferably allows substantially radial movement of the cable that is attached to its first (cable attachment) part. This has an advantage in that the cable can generally move to the radial position in which it is under the least strain, strain which may arise due to pressure of sealing material around the cable. Additionally, allowing radial movement of the cable may enable 'centering' (i.e. correct radial positioning) of cables regardless of their diameter. The first part of the attachment member preferably comprises a cable clamp, for example in the form of a hose clamp or a Jubilee Clip (Trade Mark). The second part of the attachment member preferably has one or more substantially radially extending slots within which the first parts (e.g. cable clamps) may slide. Each pair of slots and clamps will in general have an interengaging protrusion and recess to prevent or to restrict relative axial movement, and one or both of each protrusion and recess generally extends in a radial direction in order that the interengagement may be maintained over the desired relative radial movement. Preferably, the walls of the slots have rails which mate with channels in the clamps, but the contrary may be the case.

Preferably, the attachment member according to the first, second, third and fourth aspects of the invention comprises means (c) of the cable sealing device disclosed in International Patent Application No. WO93/26070 (Raychem B226), the entire disclosure of which is incorporated herein by reference.

The splice closure according to the second aspect of the invention is preferably provided with sealing material for sealing the closure against moisture ingress. When the housing of the splice closure comprises a base and a cover, the sealing material is preferably received within the base. The sealing material, which may for example comprise gel, is preferably provided as part of a sealing device comprising means for axially compressing the sealing material, comprising two compressing portions between which the sealing material is located, and means for driving the two compressing portions towards one another. One or more cable ports are preferably provided in the sealing device to allow cables to extend therethrough into the closure. Compressing the sealing material preferably urges it into sealing contact with the cables extending therethrough and also into sealing contact with the housing, preferably the base of the housing. The two end compressing portions of the sealing device may advantageously be moved towards one another by means of a bolt or the like extending through the end parts and the sealing material. A preferred form of sealing device is that disclosed in International Patent Application No. WO90/05401 (Raychem B161), the entire disclosure of which is incorporated herein by reference.

The sealing material according to the invention may, for example, comprise mastic or grease, especially a highly viscous grease such as a silicone grease. Preferably, however, the sealing material comprises gel.

The gel may, for example, comprise silicone gel, urea gel, urethane gel, or any suitable gel or gelloid sealing material.

Preferred gels comprise oil extended polymer compositions. Preferably the gel has a hardness at room temperature as determined using a Stevens-Volland Texture Analyser of greater than 45 g, particularly greater than 50 g especially greater than 55 g, e.g. between 55 g and 60 g. It preferably has a stress-relaxation less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8, more preferably at least 2.2 MPa. In general compression set will be less than 35%, especially less than 25%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm).

The polymer composition may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. Preferably, however, the polymer composition comprises one or more styrene-ethylene-propylene-styrene block copolymers, for example as sold under the Trade Mark 'Septon' by Kuraray of Japan. Septon 2006 is a particularly preferred grade. The extender liquids employed in the gel preferably comprise oils conventionally used to extend elastomeric materials. The oils may be hydrocarbon oils, for example paraffinic or naphthenic oils, synthectic oils for example polybutene or polypropene oils, and mixtures thereof. The preferred oils are mixtures of non-aromatic paraffins and naphthenic hydrocarbon oils. The gel may contain known additives such as moisture scavengers (eg. Benzoyl chloride), antioxidants, pigments and fungicides.

The splice closure is preferably also provided with a sealing member for forming a seal between two portions of the housing. For example, for embodiments in which the housing comprises a base and a cover, a sealing member is preferably provided to form a seal between the base and the cover. A preferred sealing member comprises: (a) a sealing material as described above, and (b) an elastomeric member.

The sealing material of the sealing member may, for example, comprise a gel as described above. The elastomeric member may, for example, comprise a rubber material, such as nitrile rubber. The elastomeric member preferably comprises an O-ring. A preferred sealing member is that disclosed in International Patent Application No. PCT/GB93/01809 (Raychem B236).

BRIEF DESCRIPTION OF THE DRAWINGS

All of the embodiments of the invention will now be described, by way of example, with reference to the accompanying drawings, in which:

FIG. 2 shows schematically an apparatus according to the invention in comparison to a prior art apparatus;

FIG. 6 shows several views of the attachment member of the apparatus shown in FIG. 1 and the apparatus shown in FIG. 3;

DESCRIPTION OF THE PREFERRED EMBODIMENTS

Figure 1:
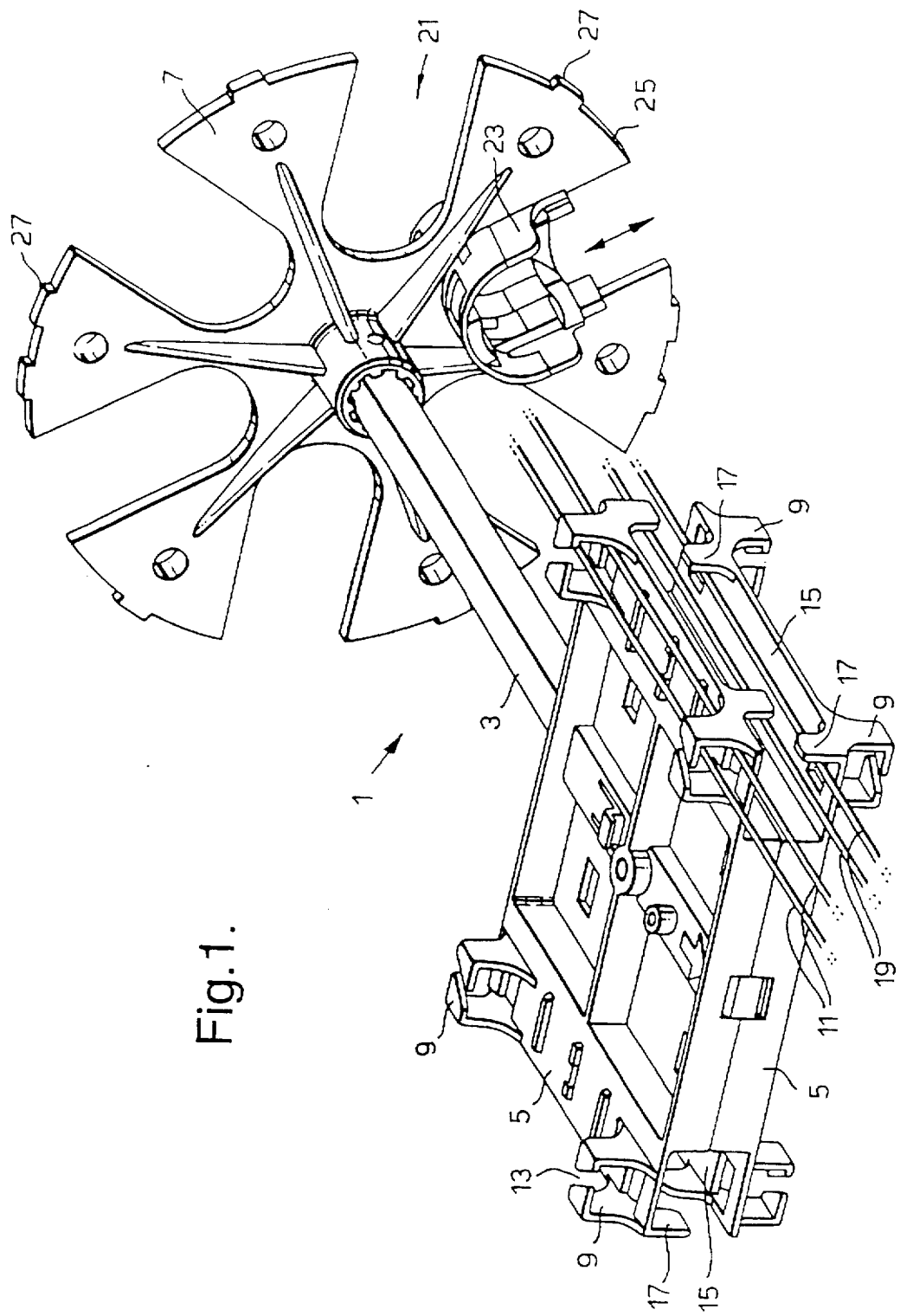
FIG. 1 shows an apparatus according to the first embodiment of the invention.

FIG. 1, as stated above, shows an apparatus 1 according to the first embodiment of the invention. A frame 3 comprises a single elongate member in the form of a bar or rod, and located on the frame is a pair of optical fibre splice organizer supports 5 and an attachment member 7. The organizer supports 5, preferably formed from a plastics material, e.g. polypropylene, have been slid- or push- or snap- fitted onto the frame 3 and are arranged in a generally back to back manner at substantially the same longitudinal position on the frame, i.e. at one end thereof. Each organizer support 5 is provided with four retaining members 9, for retaining optical fibre tubes 11, portions of which are shown schematically, the tubes containing optical fibres which will be spliced in the organizers which will be stacked on the organizer supports. Each retaining member 9 is arranged substantially to surround the tubes 11 and is provided with a slit 13 inclined to the direction in which the tubes extend, in use and as shown, when they are in a relaxed state. The tubes are positioned in the retaining members by bending them slightly so that they slot into the inclined slits. The retaining members avoid the necessity of using ties to retain the tubes. Also shown are two channels 15 formed by the cooperation of the two organizer supports, for guiding tubes 19 containing optical fibres which are not to be spliced in the organizers which will be stacked on the organizer supports. The channels are formed by projections 17 provided by each organizer support, the projections provided by one support being longitudinally spaced from the projections provided by the other support along the channel, so that the tubes 19 can be positioned in the channels by bending them slightly. These channels provided by the projections, similarly to the retaining members, avoid the necessity of using ties or the like.

The attachment member 7, which is preferably formed from metal, e.g. Aluminium, but which could be formed from plastics material, extends radially from one end of the frame 3. The attachment member is generally star-shaped, due to the fact that it is provided with a plurality, six in the apparatus shown, of slots 21 extending from the generally circular periphery of the attachment member. Each slot can receive a first portion of the attachment member, in the form of a cable clamp 23, for clamping around an optical fibre cable. The cable clamp is slidably received within the slot, being slidable generally radially as indicated by the double headed arrow. A cable may therefore have the cable clamp 23 clamped around it and then the cable clamp may be slotted into one of the slots in the main (i.e. second) part of the attachment member. The fact that the clamped cable is able to move radially allows correct radial alignment (or 'centering') with the splice organizers and can ensure that a good seal is formed with sealing material in the splice closure. The periphery 25 of the attachment member is provided with a plurality of protrusions 27 which are arranged to engage recesses in a splice closure housing substantially to prevent rotational movement of the attachment member, and hence the entire apparatus, due to torsional forces acting on the cables.

FIG. 2 shows, schematically, an apparatus I according to the invention and a prior art apparatus 29. In the prior art apparatus, all of the splice organizers 31 are arranged in a single stack on a support 33. Tubes 35 carrying optical fibres are located under the stack of organizers and loop upwardly and into the organizers. In order to gain access to a lowermost organizer, e.g. indicated 37, it is necessary to lift all of the other organizers, and this will also disturb all of the tubes 35. In contrast, however, because the apparatus of the present invention allows the organizers to be arranged in two stacks, one above the frame 43 and one below the frame, fewer organizers and tubes need to be disturbed in order to gain access to a particular organizer. In addition, the tubes are better organized in the apparatus according to the invention, since the tubes 41 which carry optical fibres which are spliced in the organizers are kept separate from the tubes 39 which carry optical fibres which are not spliced in the organizers. The supports for the organizers are shown schematically and are indicated 45.

Figure 3:
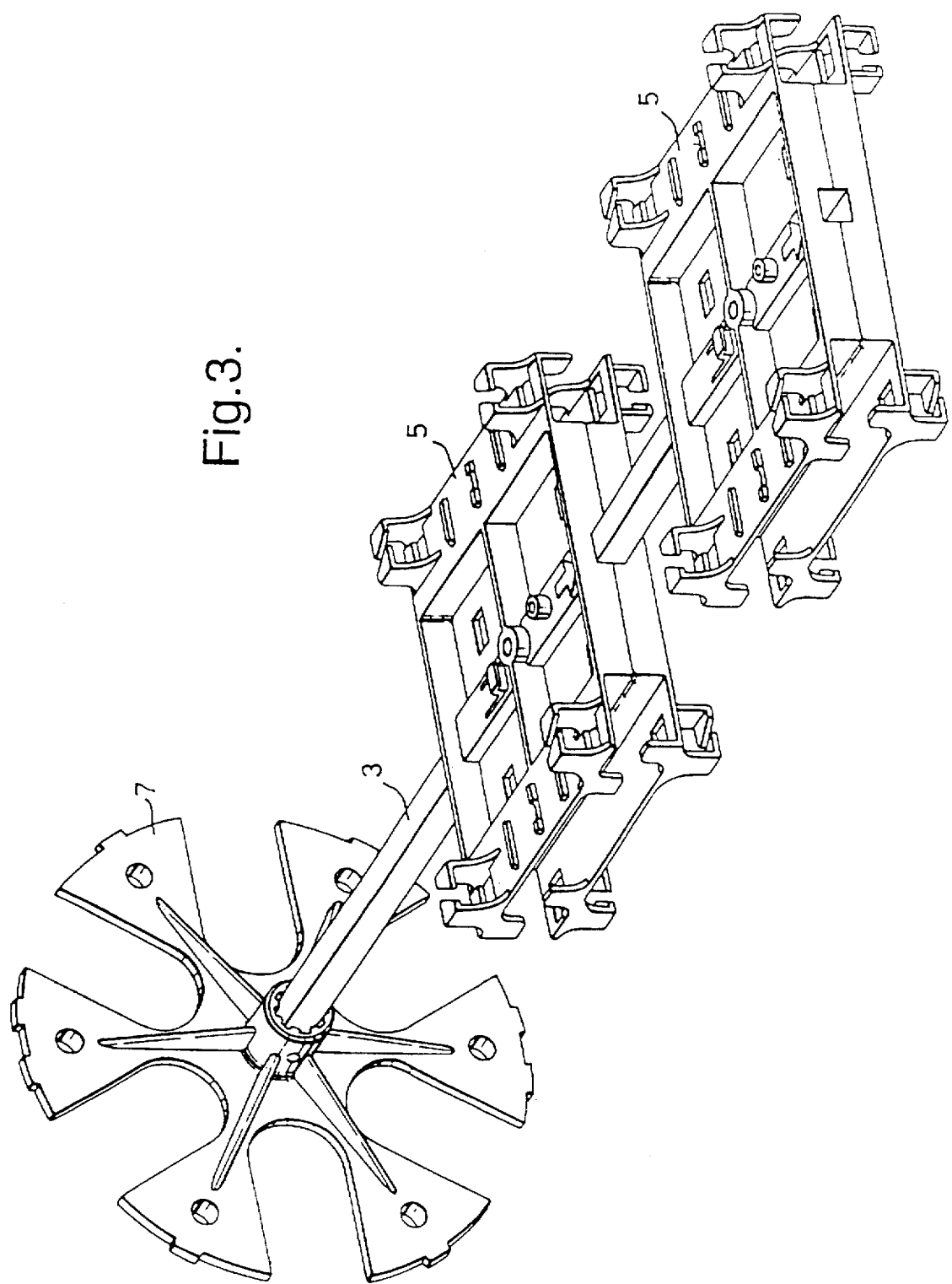
FIG. 3 shows a second form of apparatus according to the invention.
Figure 4:
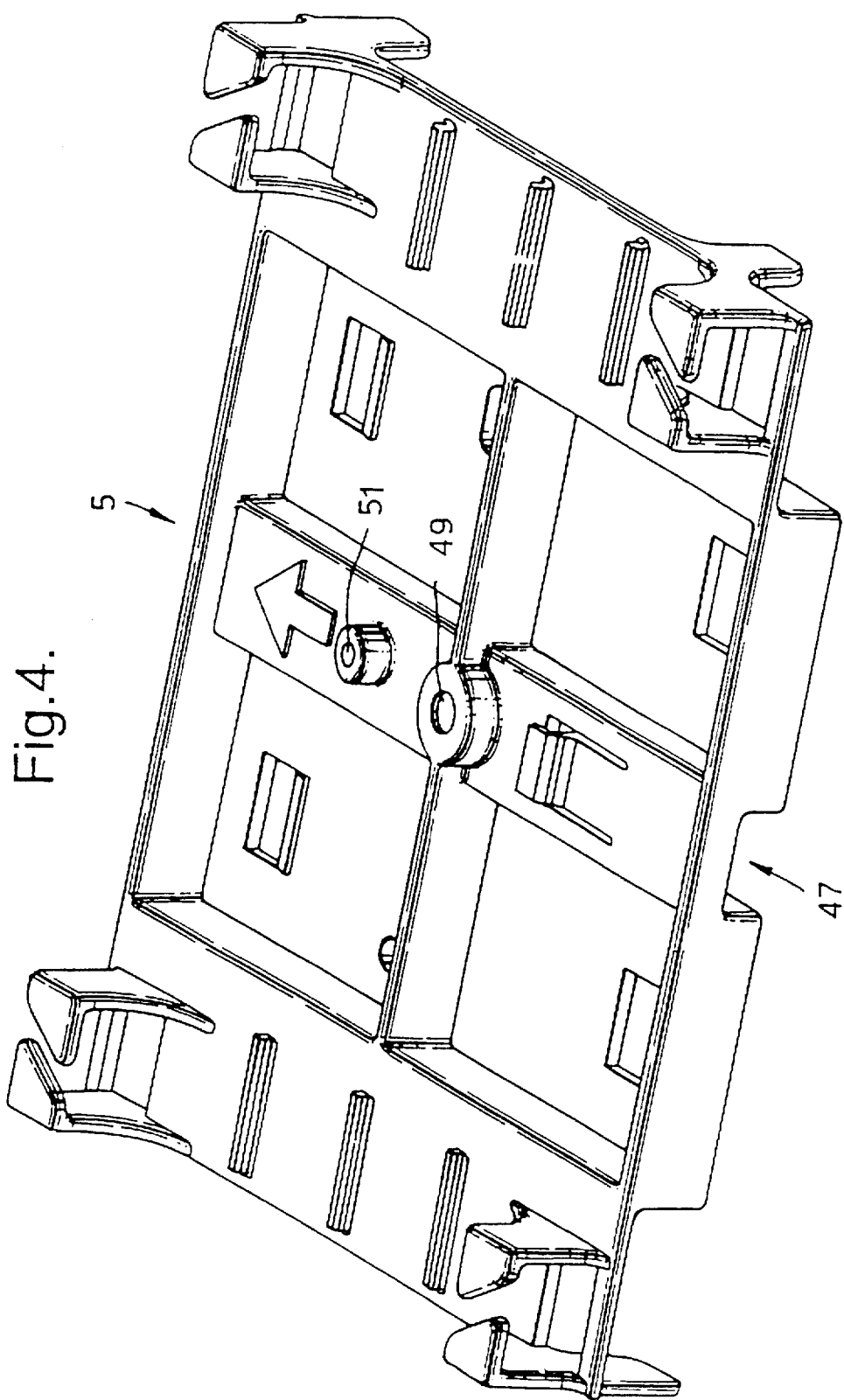
FIG. 4 shows an optical fibre splice organizer support according to the invention.

FIG. 3 shows a second form of apparatus according to the invention, which is similar to the apparatus shown in FIG. 1 but which has an additional pair of splice organizers located on the frame and spaced apart from the first pair of organizers FIG. 4 shows an optical fibre organizer support according to the invention, which is identical to the supports shown in FIGS. 1 and 3. A central channel 47 is provided on the underside of the support to enable the support to be push- or snap- fitted on the frame and/or slid onto and along the frame. A central opening 49 is provided in the support, for receiving a bolt or other elongate member around which the organizers may be located. The splice organizers may therefor be stacked on the support such that the bolt or member extends through cooperating holes in the organizers, and the stack may be secured to the support by means of a nut threaded onto the bolt, for example. An additional opening 51, spaced apart from the central opening, is for receiving a positioning pin. The positioning pin also extends through the stack of organizers, and substantially prevents rotational movement of the organizers about the bolt. A bolt and a positioning pin are shown in FIG. 7.

Figure 5:
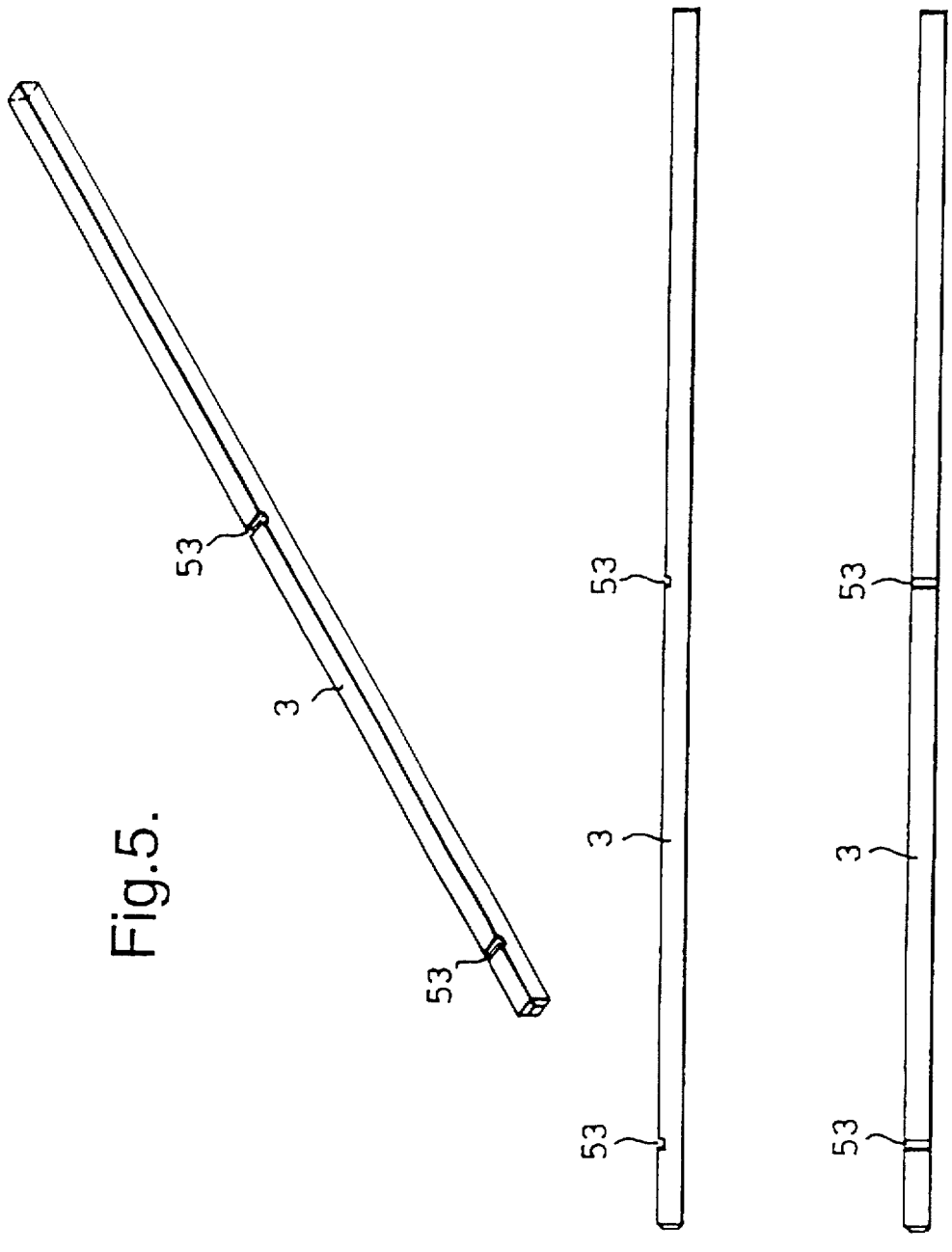
FIG. 5 shows several views of the frame of the apparatus shown in FIG. 3.

FIG. 5 shows the frame 3 of the apparatus shown in FIG. 3. The frame comprises a single elongate member in the form of a bar or rod having a substantially square cross-section. The frame is provided with two indentations 53, each of which can locate with a cooperating protrusion on the underside of the organizer supports. This generally provides a simple way of correctly positioning the supports and substantially preventing the supports accidentally sliding along the frame once they have been correctly positioned.

FIG. 6 shows several views of the attachment member shown in FIGS. 1 and 3.

Figure 7:
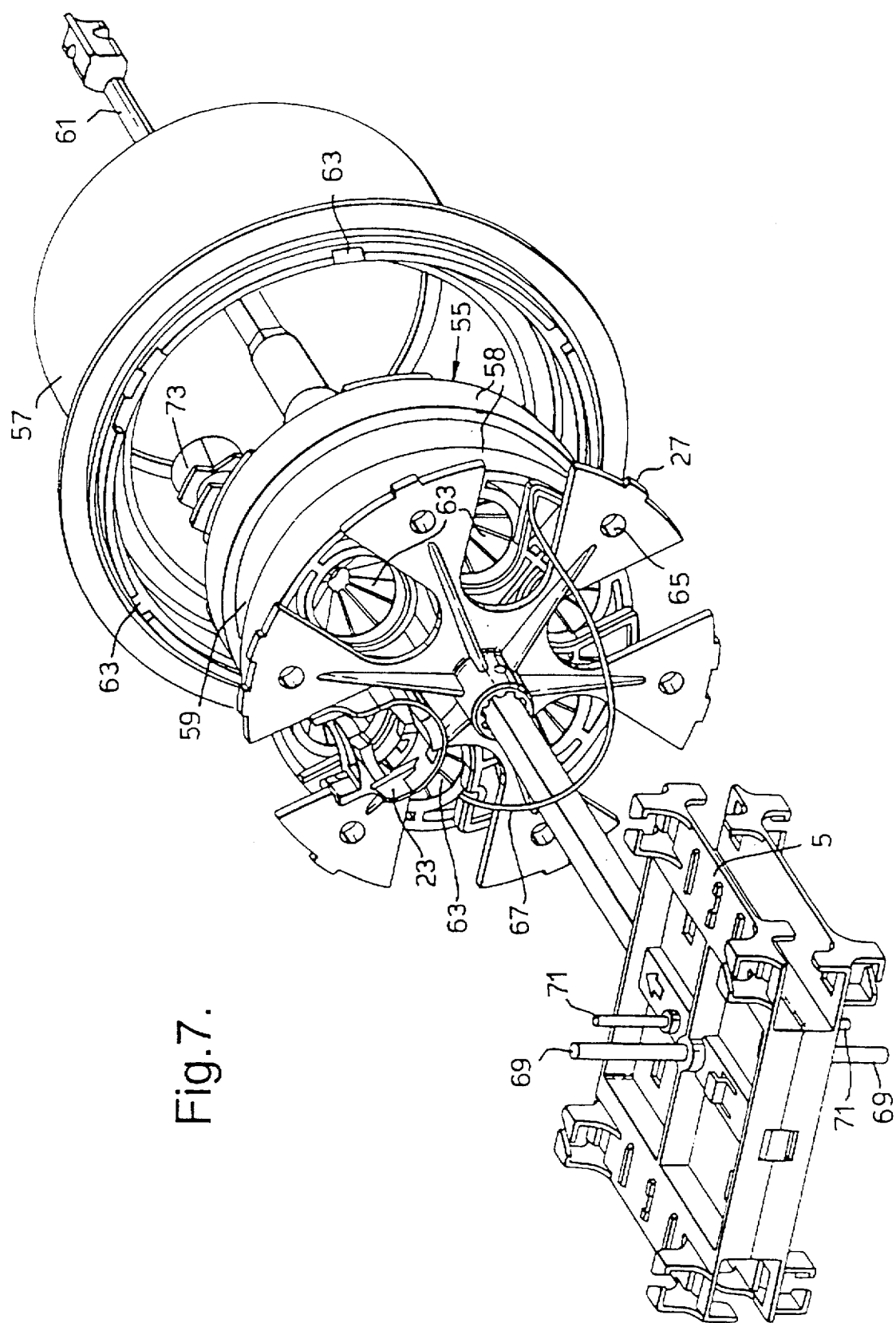
FIG. 7 shows the apparatus of FIG. 1, a sealing device and the base of a splice closure housing.
Figure 8:
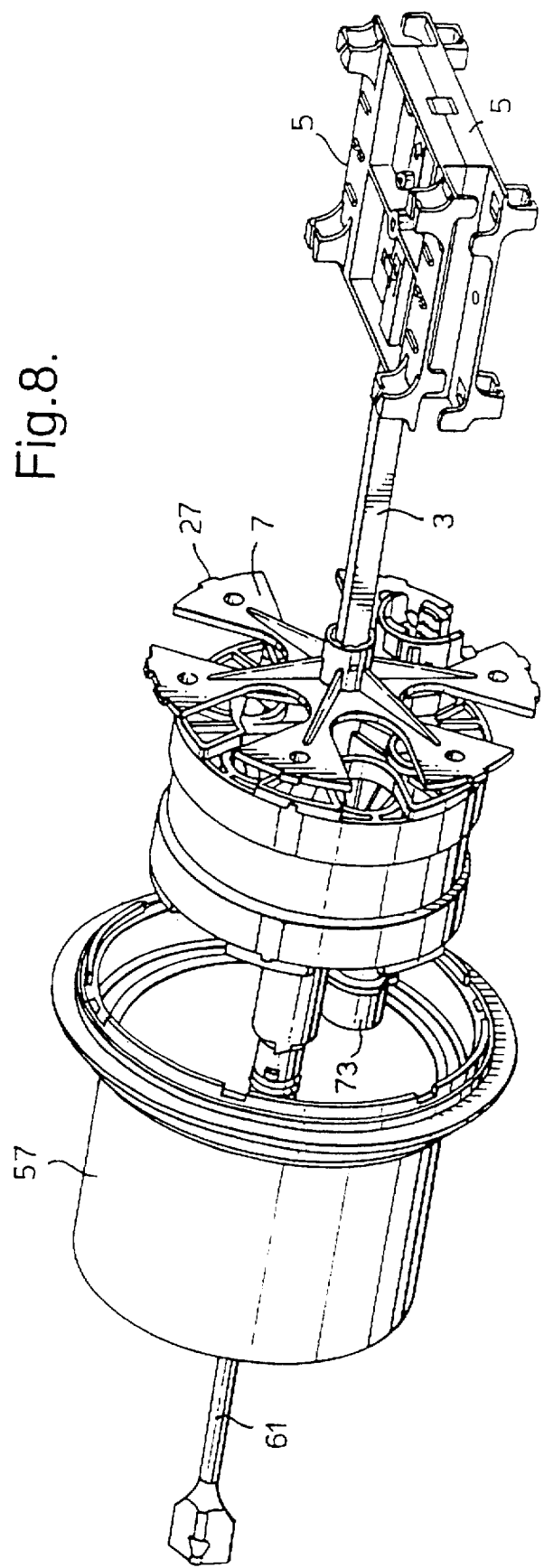
FIG. 8 shows the apparatus of FIG. 7 from another angle.
Figure 9:
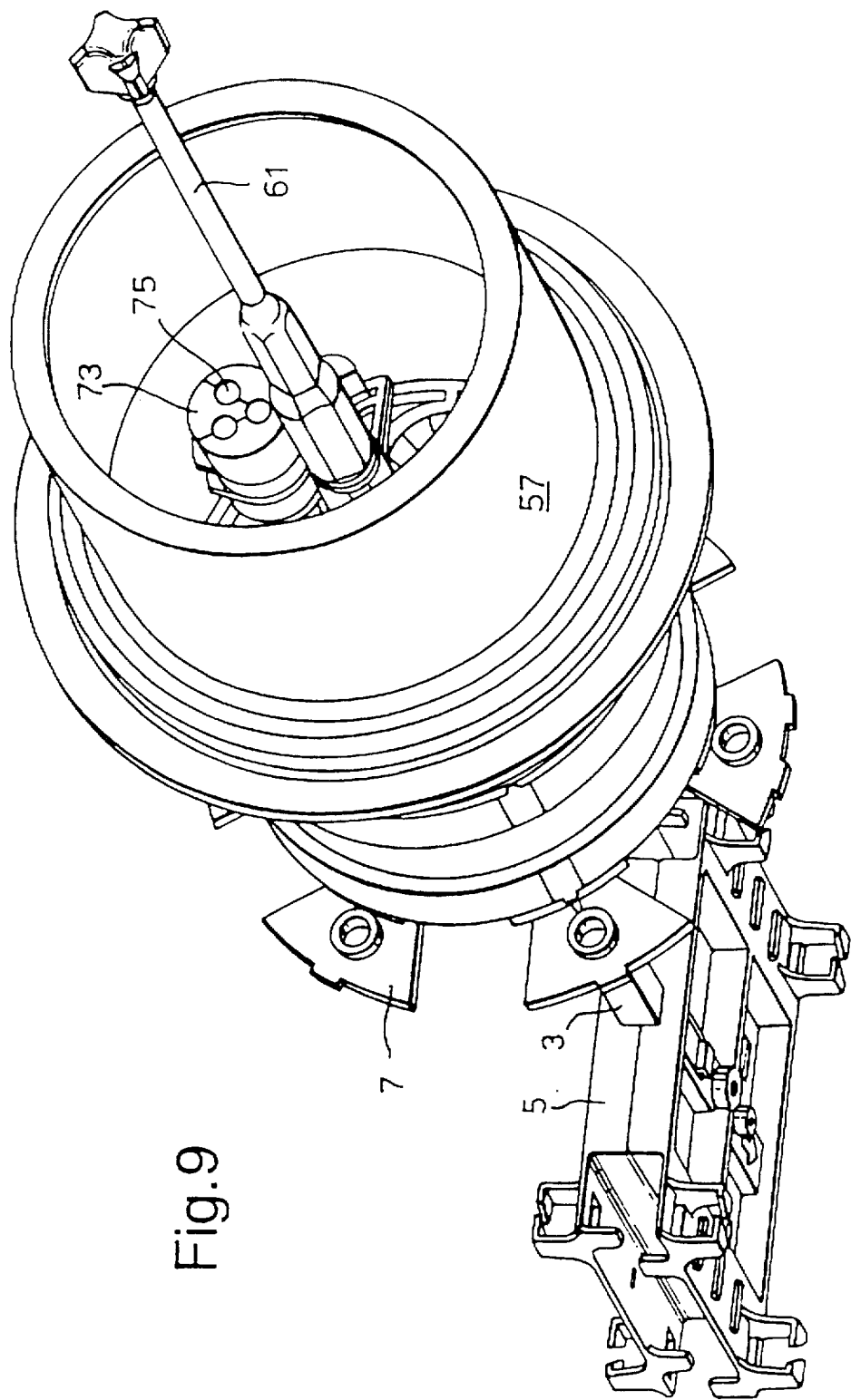
FIG. 9 shows the apparatus of FIGS. 7 and 8 from another angle.

FIGS. 7, 8 and 9 show three different views of the apparatus of FIG. 1, with a sealing device 55 and a base 57 of an optical fibre splice closure housing according to the second aspect of the invention. The sealing device 55 comprises two substantially rigid compressing portions 58 between which sealing material 59, comprising gel, is located. The sealing device includes a central bolt (not shown) which can be turned by means of the elongate member 61, and which can drive the two compressing portions 58 towards each other, thereby compressing the gel. The sealing device has six ports 63 for receiving optical fibre cables extending into the splice closure.

An optical fibre cable which is to be spliced in the splice closure may have a length of its outer jacketing stripped back to expose the optical fibres, or at least the tubes holding the optical fibres. The cable may then have the cable clamp clamped around its outer jacket near the stripped end, and the clamp, containing the cable, may be slotted into one of the slots 21 of the attachment member 7. The sealing device 55, which is hinged to open out, may then be placed around the cable, behind the attachment member, so that the cable extends through one of the ports 63. Additional cables may be added to the apparatus in the same way, and the optical fibres of the cables may be spliced and organized in organizers which are stacked on the organizer supports 5. The earthing wires may be earthed by connecting them to the metal attachment member 7, for example by bolting them thereto by means of bolts screwed into the holes 65 provided in the attachment member. When the splicing operation is complete, or even before it is complete, the sealing device containing the spliced cables may be positioned inside the base 57 and the elongate member 61 may be turned in order to compress the gel 59 and force it laterally outwards into sealing contact with the inside of the base and laterally inwards into sealing contact with the cables. The attachment member may be positioned in contact with the nearest shown open end of the base, such that the protrusions 27 arranged around the periphery of the attachment member are located in cooperating recesses 63 arranged around the open end of the base. As mentioned above, this interengagement of protrusions and recesses serves to prevent accidental rotational movement of the attachment member with respect to the housing due to torsional forces acting on the cables. A cover (not shown) may then be positioned over the apparatus and fixed to the base, trapping the attachment member between the base and the cover and thereby securing the apparatus to the housing.

An advantage of the invention is that the splice closure is re-enterable, that is to say that it may be opened up and re-closed, perhaps many times during its service life, in order to add or remove cables or splices etc. In order to ease the removal of the sealing device 55 from the base 57, a rope 67, or other suitable means, may be provided. The rope is attached to the nearest shown compressing portion 58 of the sealing device. Pulling on the rope tends to separate the two compressing portions of the sealing device, and due to the tackiness of the gel, which tends to adhere it to the compressing portions of the sealing, device, the gel will normally be stretched, thereby separating it from the inside of the base and easing the withdrawal of the sealing device from the base.

FIG. 7 also shows the bolts (indicated 69) and the positioning pins (indicated 71) extending from the holes 49 and 51 in the organizer supports, described with reference to FIG. 4.

Additionally shown in FIG. 7, and also in FIGS. 8 and 9, is an adaptor or port splitter 73 which may optionally be used with the sealing device. The port splitter has a similar construction to that of the sealing device, comprising two compressing portions located on opposite sides of a quantity of gel, and having one or more (e.g. three as shown in FIG. 9) ports 75 extending therethrough. The port splitter is insertable into a port 63 of the sealing device to form a seal between the sealing device and a drop fibre or a small diameter cable etc.

Figure 10:
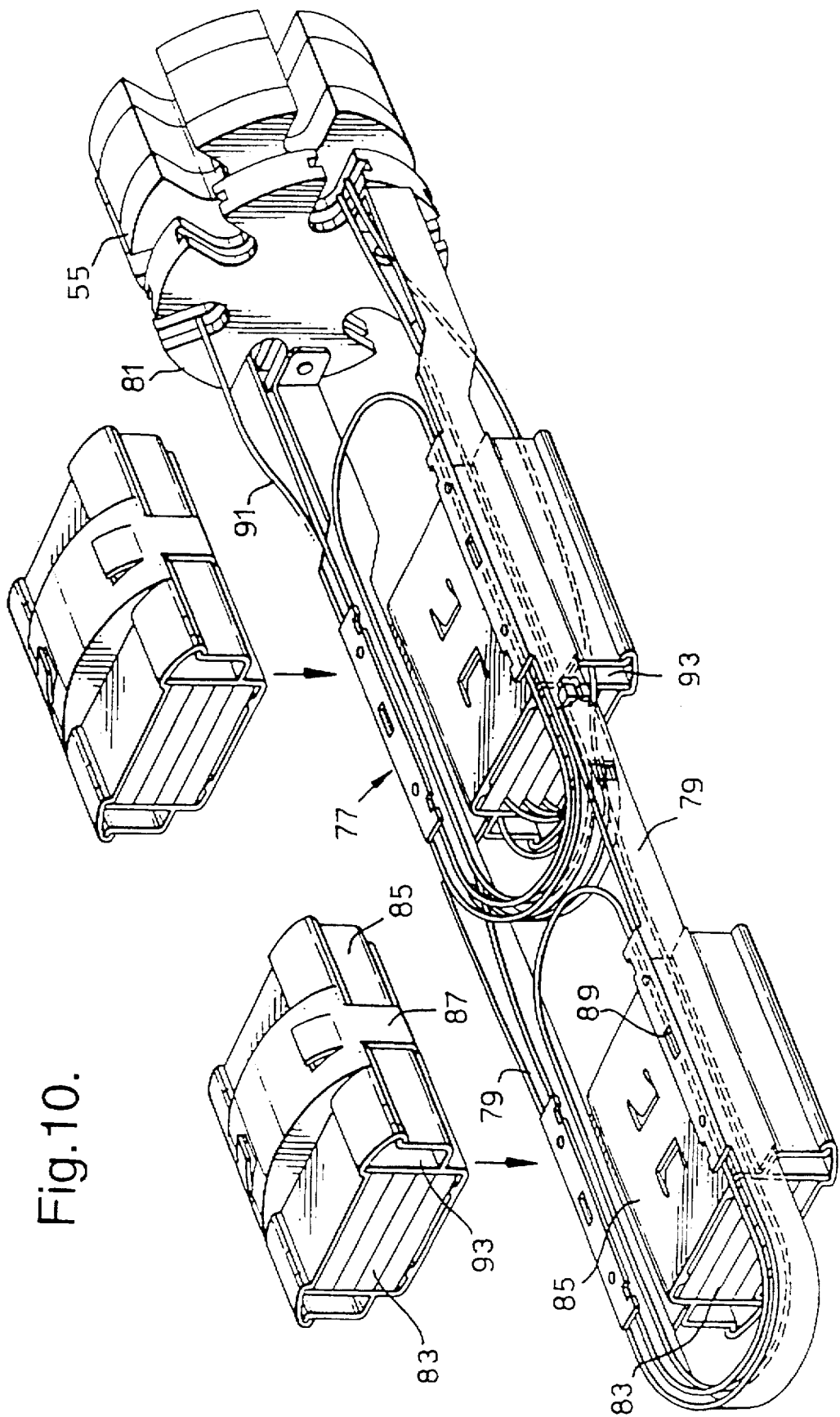
FIG. 10 shows an another form of apparatus according to the first aspect of the invention.

FIG. 10 shows an apparatus according to the invention which is different to the apparatus shown in the preceding figures. The apparatus 77 comprises an elongate frame comprising two generally parallel elongate members 79 formed from a single bent strip of metal. The frame is attached to an attachment member 81 which is substantially the same as the attachment member 7 described above. A sealing device 55, identical to that described above, is also shown.

Two stacks of optical fibre splice organizers 83 are attached to the underside of the frame by means of organizer supports 85. Two further stacks of organizers located in organizer supports are shown separated from the top side of the frame, the downwardly pointing arrows indicating that the supports containing the organizers may be located on the frame. The organizer supports may be attached to the frame by detent means 87 engaging with slots 89 in the frame.

Tubes 91 containing optical fibres, shown schematically, are arranged on the apparatus in a looping fashion. Tubes containing optical fibres which are not spliced in the organizers are guided around the apparatus by means of the frame, and tubes containing optical fibres which are spliced in the organizers are guided by means of organizer supports, through guide means in the form of channels 93 extending along the sides of the organizer supports.

Figure 11:
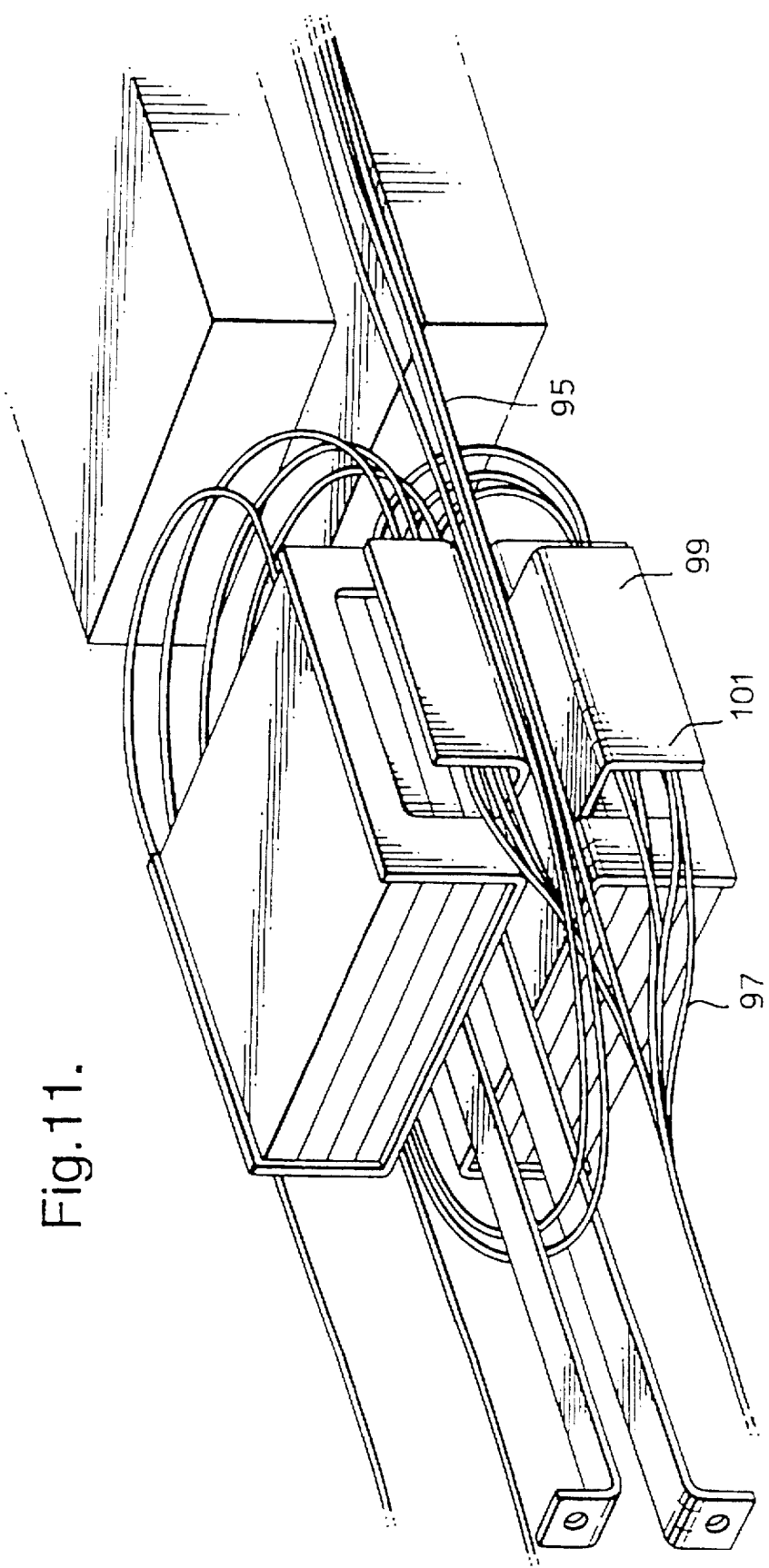
FIG. 11 shows schematically yet another form of apparatus according to the first aspect of the invention.

FIG. 11 shows, schematically, yet another from of apparatus according to the first aspect of the invention. Looped tubes 95 containing un-spliced optical fibres are shown guided between the organizer supports 99 and looped tubes 97 containing spliced optical fibres are shown guided by channels 101 along the sides of the organizer supports.

Figure 12:
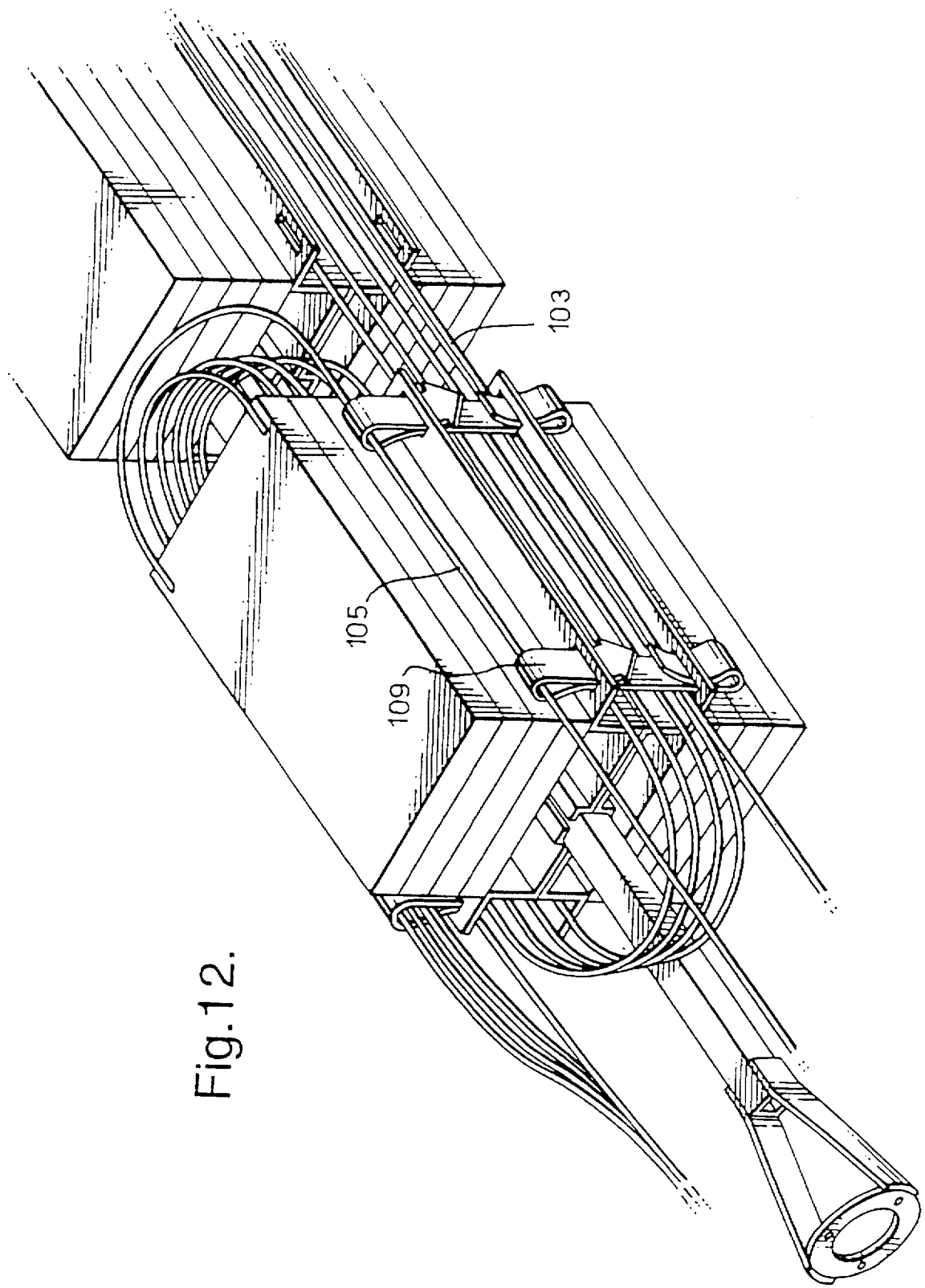
FIG. 12 shows schematically a further form of apparatus according to the first aspect of the invention.

FIG. 12 shows a further form of apparatus according to the invention. In this form of apparatus, the organizer supports 107 are formed integrally in pairs (shown more clearly in FIG. 13) and are slid onto the frame, the frame comprising a single elongate member of square cross-section. Tubes 103 holding un-spliced optical fibres are guided along channels formed between the organizer supports and tubes 105 holding spliced optical fibres are guided by means of ties 109 which are looped through slots 111 in the organizer supports. The ties 109 also serve to retain the tubes 103 in the channels between the organizer supports.

Figure 13:
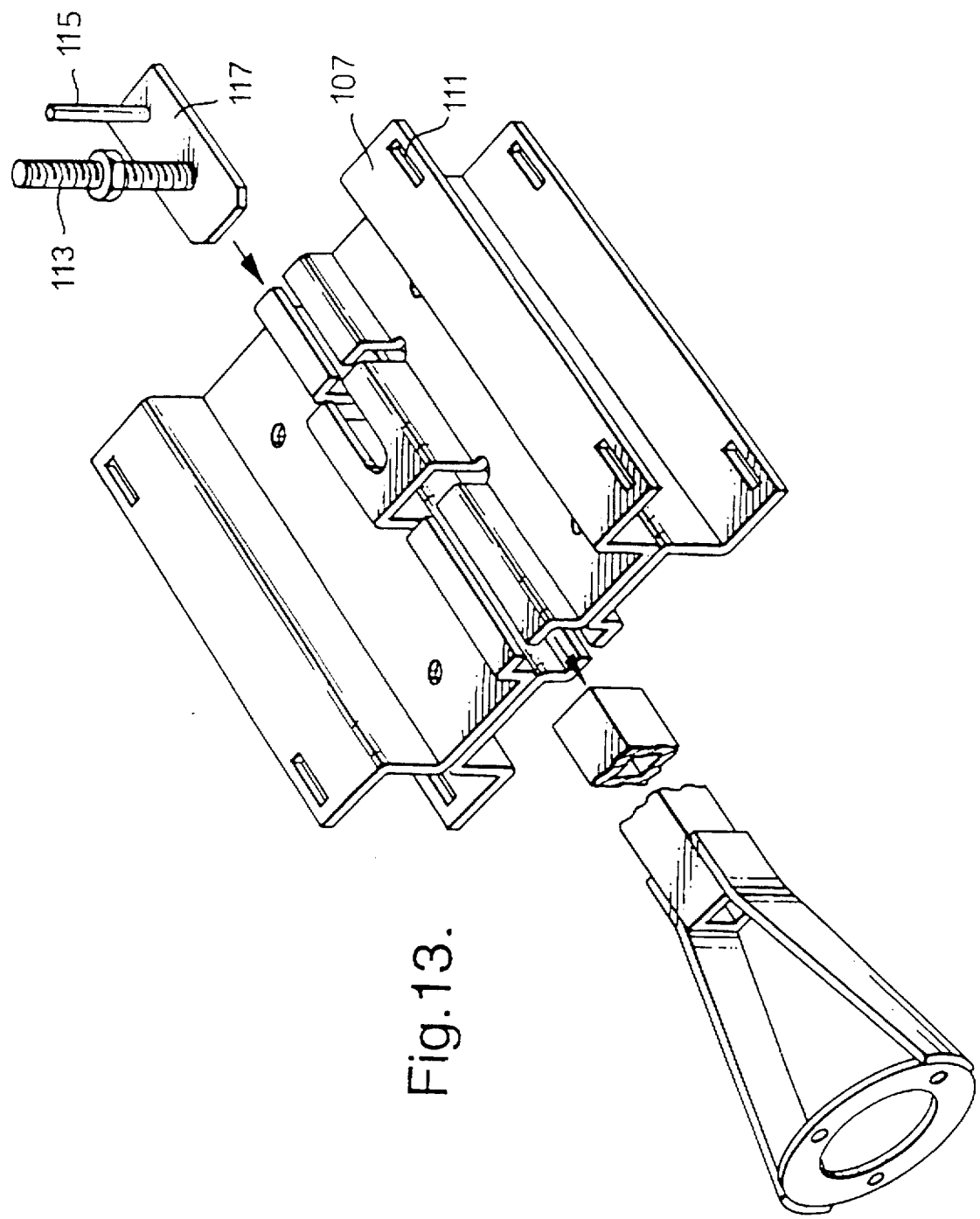
FIG. 13 shows a detail of the apparatus shown in FIG. 12.

FIG. 13 shows an integral pair of organizer supports of the kind shown in FIG. 12. Also shown is a bolt 113 and a positioning pin 115 mounted on a plate 117, which plate may be slidably received in the organizer support as indicated by the arrow.

Figure 14:
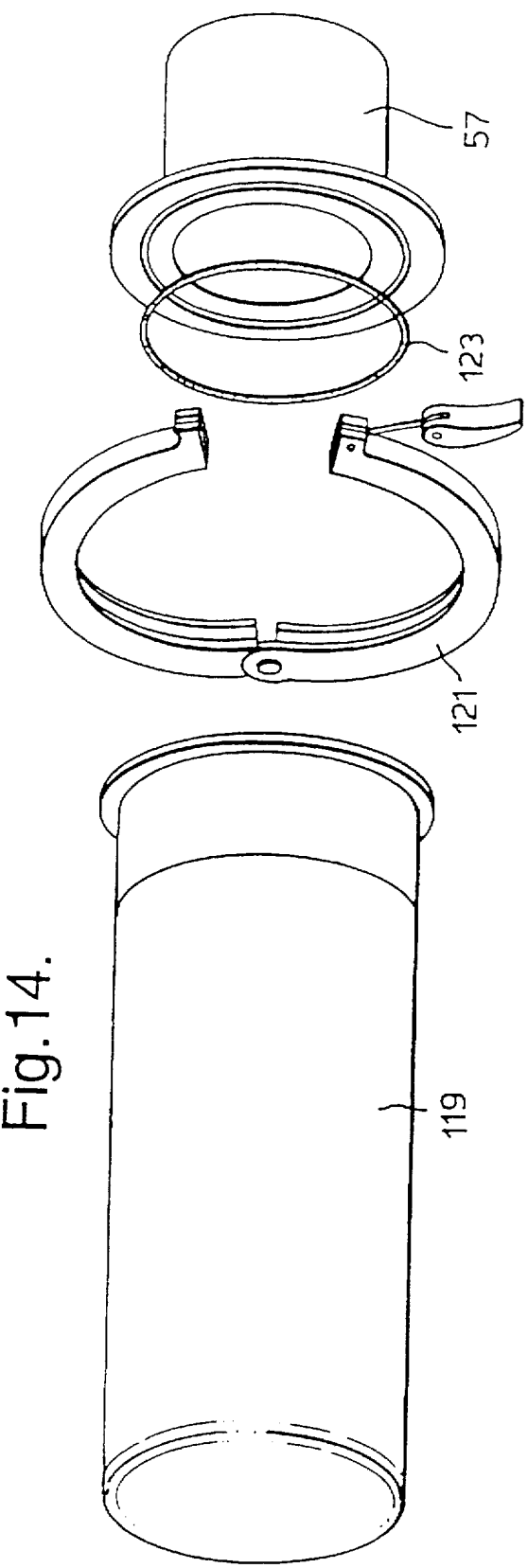
FIG. 14 shows the component parts of a housing of an optical fibre splice closure according to the second aspect of the invention.

FIG. 14 shows the component parts of a housing of a splice closure according to the second aspect of the invention. The housing comprises a base 57 (as shown in FIGS. 7 to 10), a cover 119, a clamping device 121 for clamping together the cover and the base, and a O ring 123 for forming an environmental seal between the cover and the base.

Figure 15:
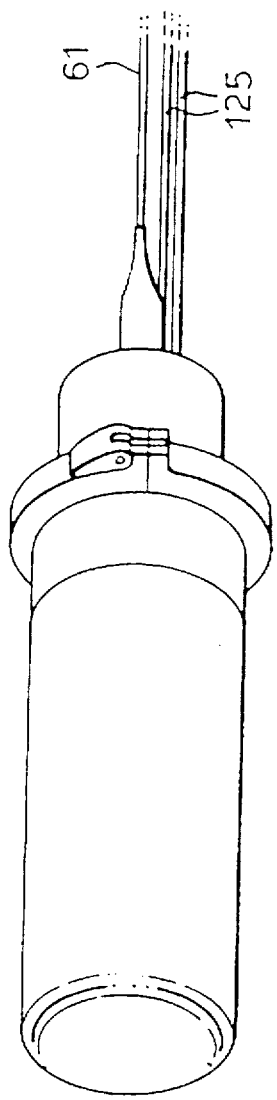
FIG. 15 shows the housing of FIG. 14, fully closed and sealed and having two optical fibre cables extending therein.

FIG. 15 shows the housing of FIG. 14, fully closed and sealed and having two optical fibre cables 125 extending therein. Also shown is the elongate member 61 shown in FIGS. 7 to 10, for compressing the gel of the sealing device located in the base of the cover.

I claim:

1. An apparatus for arranging a plurality of stacks of optical fibre splice organizers, the apparatus comprising:
   a frame; and
   at least two optical fibre splice organizer supports positioned on the frame, each organizer support having at least one different organizer associated therewith, wherein at least two organizer supports are arranged back to back and are located at substantially the same longitudinal position on the frame, wherein each is arranged to support a stack of organizers which extends in the opposite direction to that supported by the other organizer support, wherein the back to back organizer supports cooperate to provide at least one channel to guide at least one optical fibre positioned in at least one tube extending, in use, into a closure.

2. An apparatus according to claim 1, wherein at least part of the frame is elongate, and each organizer support is arranged to support a stack of organizers which extends laterally with respect to the frame or at least that part of the frame which is elongate.

3. An apparatus according to claim 1, wherein the at least one channel is formed, at least in part, by at least one projection provided by each organizer support, the at least one projection provided by one organizer support being longitudinally spaced from at least one projection provided by the other organizer support along the channel.

4. An apparatus according to claim 1, wherein the at least one channel is arranged to guide optical fibres which are not spliced within a closure.

5. An apparatus according to claim 1, which further comprises one or more additional organizer supports located at another longitudinal position on the frame.

6. An apparatus according to claim 5, which comprises two or more pairs of organizer supports, each pair located at a different longitudinal position on the frame.

7. An apparatus according to claim 1, wherein each organizer support is separable, in use, from the frame.

8. An apparatus according to claim 1, wherein the frame comprises a single elongate member.

9. An apparatus according to claim 1, wherein at least one of the organizer supports is provided with one or more retaining members arranged to retain one or more optical fibres, preferably in one or more tubes, which, in use, are spliced in at least one optical fibre splice organizer supported by the said organizer support.

10. An apparatus according to claim 9, wherein the or each retaining member is arranged substantially to surround the optical fibres and has a slit to allow the optical fibres to be positioned therein, wherein the slit is inclined to the direction in which the fibres extend, in use, when they are in a relaxed state.

11. An optical fibre splice closure, comprising:
   (a) an apparatus according to claim 1; and
   (b) a housing to enclose the apparatus.

12. A splice closure according to claim 11, wherein both the frame of the apparatus and the housing are elongate, the frame being arranged to extend longitudinally within the housing.

13. A splice closure according to claim 11, comprising a butt splice closure, the housing comprising a base, through which one or more cables may extend, and a cover for the base.

14. A splice closure according to claim 13, having sealing material received within the base of the housing.

15. A splice closure according to claim 13, wherein:

the frame is attached to, or is integral with, an attachment member which can attach the frame to a housing of an optical fibre splice closure, and the attachment member is arranged to be attached to the housing by being trapped between the base and the cover thereof.

16. A splice closure according claim 14, wherein the sealing material is provided with means for axially compressing it, comprising two compressing portions between which the sealing material is located and means for driving the two compressing portions towards one another.

17. An apparatus according to claim 1, which additionally comprises one or more stacks of optical fibre splice organizers, the or each stack supported by an optical fibre splice organizer support.

18. An apparatus for arranging a plurality of stacks of optical fibre splice organizers, the apparatus comprising:

a frame; and at least two optical fibre splice organizer supports positioned on the frame, each organizer support having at least one different organizer associated therewith, at least one of the organizer supports being oriented in a different direction with respect to the frame than at least one of the other organizer supports so that the at least one different organizer associated with each organizer support also has an orientation in a different direction with respect to the frame, wherein the frame is attached to, or is integral with, an attachment member which can attach the frame to a housing of an optical fibre splice closure, wherein the attachment member further comprises a cable clamp that can transmit an axial force on the cable to the housing.

19. An apparatus according to claim 18, wherein the attachment member is located substantially at one end of the frame.

20. An apparatus according to claim 18, wherein the attachment member has a first part for attachment to a cable and a second part for attachment to the housing.

21. An apparatus according to claim 18, wherein the attachment member allows substantially radial movement of the cable.

22. An apparatus according to claim 19, wherein the second part of the attachment member is arranged to cooperate with the housing substantially to prevent rotational movement of the attachment member with respect to the housing due to torsional forces on the cables.

23. An apparatus according to claim 18, wherein the frame is elongate and the attachment member extends radially from the frame.

\* \* \* \* \*